United States Patent [19]
Mizuno et al.
[11] Patent Number: 4,625,221
[45] Date of Patent: Nov. 25, 1986

[54] APPARATUS FOR EJECTING DROPLETS OF INK

[75] Inventors: Tsuneo Mizuno, Yokohama; Noboru Takada, Machida; Michio Shimura, Yokohama; Tohru Satoh, Yokohama; Tadashi Matsuda, Yokohama, all of Japan

[73] Assignee: Fujitsu Limited, Kawasaki, Japan

[21] Appl. No.: 720,483

[22] Filed: Apr. 5, 1985

Related U.S. Application Data

[63] Continuation of Ser. No. 480,580, Mar. 30, 1983, abandoned.

[30] Foreign Application Priority Data

Mar. 31, 1982 [JP] Japan ............................... 57-052963

[51] Int. Cl.⁴ ............................................ G01D 15/18
[52] U.S. Cl. ................................ 346/140 R; 310/317
[58] Field of Search .................. 346/140, 1.1; 310/317

[56] References Cited

U.S. PATENT DOCUMENTS

| | | | |
|---|---|---|---|
| 2,512,743 | 6/1950 | Hansell | 346/140 X |
| 3,683,212 | 8/1972 | Zoltan | 346/140 X |
| 3,683,396 | 8/1972 | Keur | 346/75 X |
| 3,946,398 | 3/1976 | Kyser | 346/140 X |
| 4,112,433 | 9/1978 | Vernon | 346/140 X |
| 4,266,232 | 5/1981 | Juliana | 346/140 |
| 4,282,535 | 8/1981 | Kern | 346/140 |
| 4,369,455 | 1/1983 | McConica | 346/140 |
| 4,393,384 | 7/1983 | Kyser | 346/140 X |
| 4,398,204 | 8/1983 | Dietrich | 346/140 |
| 4,471,363 | 9/1984 | Hanaoka | 346/140 |

FOREIGN PATENT DOCUMENTS 3026768 1/1981 Fed. Rep. of Germany .

OTHER PUBLICATIONS

Beasley, J. D.; Model for Fluid Ejection & Refill in a Impulse Drive Jet, SPSE, vol. 21, No. 2, Mar./Apr. 1977, pp. 78-82.

Kyser et al; Design of an Impulse Ink Jet, Journal of Applied Photo Engineering, vol. 7, No. 3, Jun. 1981, pp. 73-79.

*Primary Examiner*—Joseph W. Hartary
*Attorney, Agent, or Firm*—Staas & Halsey

[57] ABSTRACT

An apparatus for ejecting droplets of ink including: a passage for ink; an orifice disposed at one end of the passage; a pressure-applying device for applying a pressure wave to the ink within the passage; and a signal-supplying device for supplying an actuating signal to the pressure-applying device. The frequency of the signal is such that the displacement of the ink surface at the orifice due to the pressure wave is maximized.

2 Claims, 22 Drawing Figures

APPARATUS FOR EJECTING DROPLETS OF INK

This is a continuation of co-pending application Ser. No. 480,580 filed on Mar. 30, 1983 now abandoned.

BACKGROUND OF THE INVENTION

The present invention relates to a method and an apparatus for ejecting droplets of ink in an ink jet printer. More particularly, it relates to a method and an apparatus for ejecting droplets of ink in which the droplets are ejected by vibrating the ink.

A drop-on-demand type ink jet printer ejects droplets of ink from an ink reservoir to form dots on a printing medium corresponding to the image to be printed. A method of ejecting droplets of ink by using such a drop-on-demand type ink jet printer is disclosed in U.S. Pat. No. 2,512,743. In this known method, a plurality of droplets are sprayed so as to form one dot. Therefore, it is difficult to form a fine dot. Also, the manner of the ejection of the droplets does not constantly correspond to the frequency of the acoustic wave for generating pressure for ejecting the droplets.

An ink jet printer which forms each dot with one droplet is disclosed in U.S. Pat. No. 3,946,398. In this printer, pressure for ejecting a droplet of ink is constantly applied to the ink until a droplet is ejected from the nozzle of the printer. Therefore, the interval between ejections is long and it is difficult to achieve high speed printing.

Another ink jet printer which forms each dot with one droplet of ink is disclosed in U.S. Pat. No. 3,683,212. The attenuation time for the vibration of the ink at the nozzle of this printer is long. Therefore, the interval between ejections is long and it is difficult to achieve high speed printing.

A device for minimizing the attenuation time for vibration of the ink is disclosed in Japanese Patent Publication No. 54-32572. However, the construction of this device is complicated and it is difficult to apply this device to a multi-nozzle structure.

SUMMARY OF THE INVENTION

It is an object of the present invention to provide a method and apparatus for ejecting droplets of ink in which the droplets are reliably ejected at a high rate.

An apparatus for ejecting droplets of ink according to the present invention includes: a passage for the ink with an orifice at the end, a pressure-applying means for applying a pressure wave to the ink within the passage and a signal-supplying means for supplying an actuating signal to the pressure-applying means. The frequency of the actuating signal is such that the displacement of the ink surface at the orifice due to the pressure wave is maximized.

DESCRIPTION OF THE PREFERRED EMBODIMENTS

Figure 1:
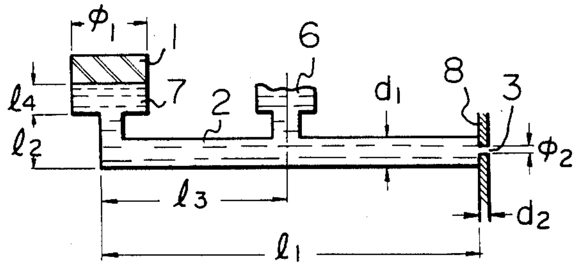
FIG. 1 is a sectional view of an apparatus for ejecting droplets of ink according to the present invention.

The structure of an apparatus for ejecting droplets of ink according to the present invention is illustrated in FIG. 1. A nozzle plate 8 is disposed at an end of an ink passage 2. The nozzle plate 8 has an orifice 3. A pressure chamber 7 is disposed at the other end of the ink passage 2. A piezoelectric crystal chip 1 is disposed on the pressure chamber 7. Ink is supplied to the ink passage 2 from an ink reservoir 6.

Figure 2:
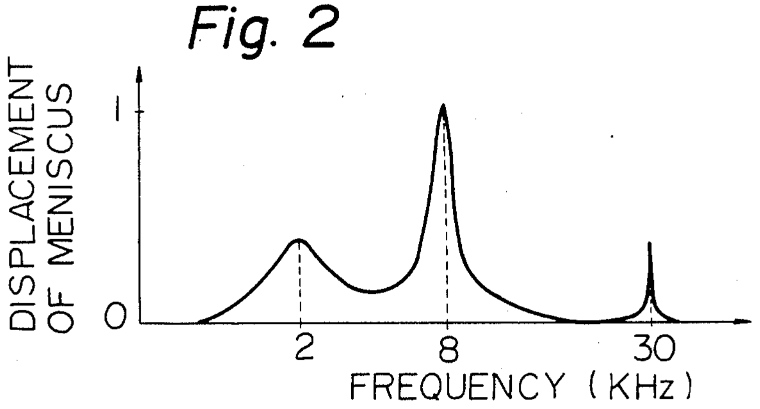
FIG. 2 is a graph illustrating experimental results of the displacement of the meniscus with respect to the frequency.

FIG. 2 is a graph illustrating the experimental results of the displacement of the meniscus at the orifice 3 when a signal with a sinusoidal wave was applied to the apparatus for ejecting droplets of ink of FIG. 1. The apparatus tested had the following construction:

Length $l_1$ between the angled end of the ink passage 2 and the nozzle plate 8: 25 mm
Length $l_3$ between the angled end of the ink passage 2 and the center line of the opening of the ink reservoir 6: 20 mm
Diameter $\phi_1$ of the pressure chamber 7: 5 mm
Height $l_4$ of the pressure chamber 7: 0.05 mm
Length $l_2$ between the bottom of the pressure chamber 7 and the far wall of the ink passage 2: 1 mm
Thickness $d_2$ of the nozzle plate 8: 200 $\mu$m
Diameter $\phi_2$ of the orifice 3: 50 $\mu$m
Viscosity of the fluid (distilled water) in the ink reservoir: 1 cst In the experiment, various actuating signals of different frequencies were applied to the apparatus and the maximum projected portion of the meniscus was measured for each frequency. The measured data was normalized with respect to the maximum displacement, which value is represented by "1". The amplitude of the supplied signal was such that the ink was not ejected even at maximum displacement of the meniscus. As can be seen from the graph, the maximum displacement of the meniscus was at a frequency of 8 kHz. This frequency of 8 kHz is the inherent resonance frequency of the meniscus at the orifice. Such a resonance frequency depends upon the shape and size of the apparatus and the ink material. Droplets of ink can be effectively ejected at a high speed by actuating the piezoelectric crystal chip 1 with a signal wave of the above-mentioned resonance frequency so that a pressure wave for ejecting a droplet of ink is generated.

As can be seen from the graph of FIG. 2, other resonances appear at 2 kHz and 30 kHz. It is thought that the resonance at 2 kHz corresponds to the location and the shape of the ink reservoir 6 and to the viscosity of the ink. It is also thought that the resonance at 30 kHz is an acoustic resonance in the pressure chamber 7. It is desirable to suppress these unnecessary mechanical resonance frequencies since they cause the generation of unnecessary satellite particles which are ejected along with the desired droplets.

Figure 3:
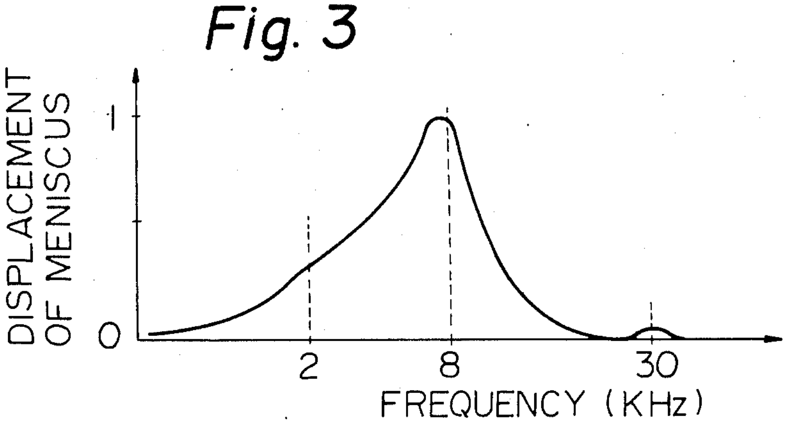
FIG. 3 is a graph illustrating other experimental results of the displacement of the meniscus with respect to the frequency.

FIG. 3 is a graph illustrating other experimental results of the displacement of the meniscus. In this experiment, an ink having a viscosity of 5 (cst) was used. The other experimental conditions were the same as those of the first-mentioned experiment. As can be seen from the graph, the unnecessary resonances at 2 kHz and 30 kHz are suppressed or are obscured. It was confirmed in the experiment that each peak of these unnecessary oscillations was suppressed, indicating that the strength of the inherent resonance of the meniscus was increased in accordance with an increase in the viscosity of the ink from 1 (cst). Adjustng the viscosity of the ink is especially effective for suppressing or obscuring unnecessary resonance at a frequency lower than that of the inherent resonance.

Figure 4:
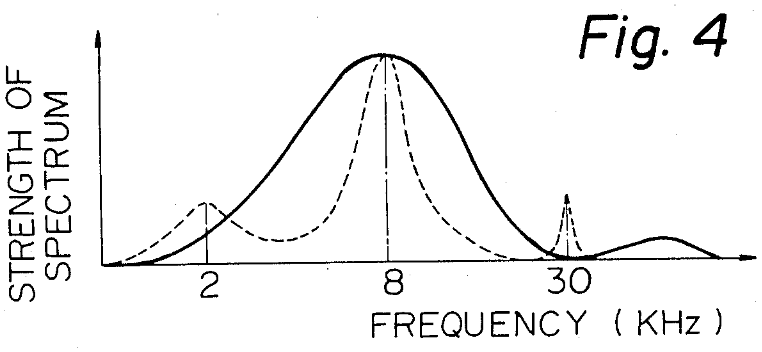
FIG. 4 is a graph illustrating an actuating pulse signal wave according to the present invention.
Figure 5:
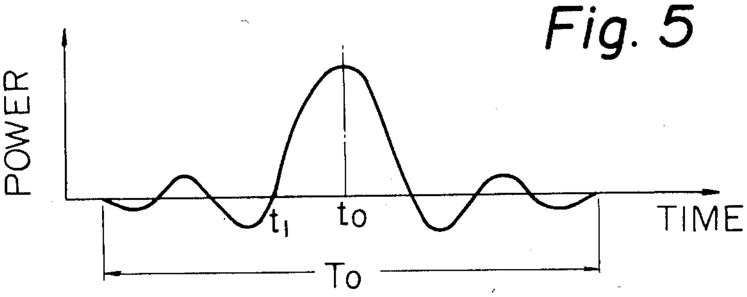
FIG. 5 is a graph illustrating the pulse signal wave of FIG. 4 with respect to time.
Figure 6:
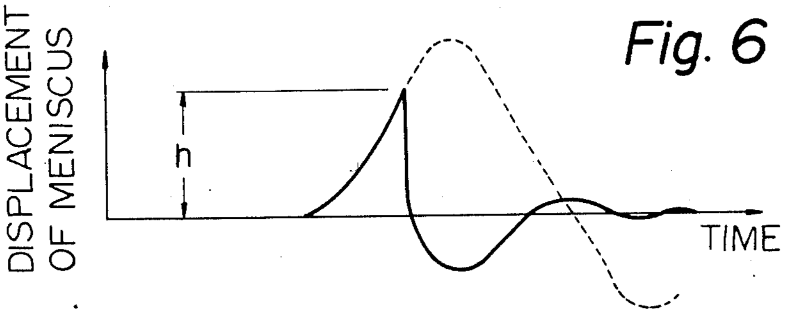
FIG. 6 is a graph illustrating the displacement of the meniscus with respect to time.

The frequency characteristic of a preferable pulse signal for actuating the apparatus of the present invention is represented by the solid line in the graph of FIG. 4. The abscissa of the graph represents the frequency of the signal, and the ordinate represents the spectrum strength of the signal. The broken line in the graph represents the displacement of the meniscus shown in FIG. 2. This pulse signal can suppress a resonance of 30 kHz, which is higher than the frequency of the inherent resonance of 8 kHz. The shape of this pulse signal with respect to time is shown in FIG. 5. The abscissa represents time, and the ordinate represents power. An ejection test was carried out by applying this pulse signal to the piezoelectric crystal chip 1 of the apparatus for ejecting droplets of ink illustrated in FIG. 1. The conditions of the test were the same as those of the experiment of FIG. 3 using ink with a viscosity of 5 (cst). The pulse signal was transformed into a pressure wave in the pressure chamber 7. The pressure wave was propagated into the ink passage 2. During propagation through the ink passage 2, the pressure wave was reformed into a pressure wave having a peak at 8 kHz due to the shape and size of the ink passage 2 and the viscosity of the ink so as to generate the inherent resonance of the meniscus at the orifice 3. The displacement of the meniscus corresponds to the power of the pulse signal. Therefore, by increasing the power of the pulse signal, it is possible to increase the displacement of the meniscus so that it exceeds a prescribed value h (FIG. 6) which is necessary to separate a droplet of ink at the orifice 3 and which is determined by the diameter of the orifice 3 and the kinematic energy of the ink. When the displacement of the meniscus exceeds the value h, a droplet of ink is separated and ejected from the orifice 3. The displacement of the meniscus at the orifice 3 is represented by the solid line in FIG. 6.

Figure 7:
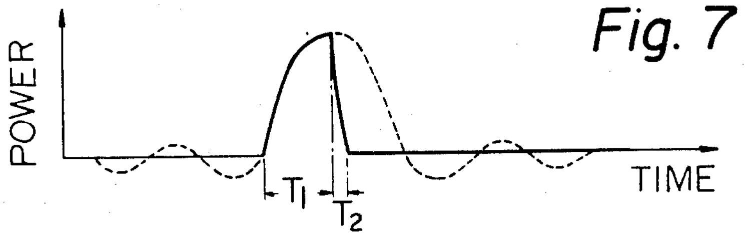
FIG. 7 is a graph illustrating a preferred actuating pulse signal wave according to the present invention.
Figure 8:
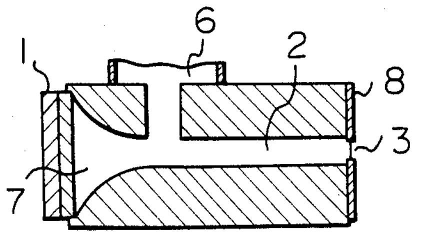
FIGS. 8 to 12 are sectional views of the apparatus for ejecting droplets of ink according to the present invention, each view illustrating a different point in time.

The pulse signal of FIG. 5 has a long time range $T_0$. The time period which contributes to the ejection of the ink is substantially between $t_1$ and $t_0$. It is preferable to form a pulse signal which contributes to the projection of the ink from the orifice 3 during the time period between $t_1$ and $t_0$ while simultaneously contributing to the separation of the ink after the time $t_0$. An example of such a preferable pulse signal is illustrated by the solid line in FIG. 7. The broken line in FIG. 7 represents the pulse signal of FIG. 5. The pulse signal of the solid line has the same shape as that of the broken line during the time period $T_1$ and sharply falls during the time period $T_2$. Such a pulse signal makes it possible to effectively separate a droplet of ink since it applies a separating force during the time period $T_2$ in a direction opposite to the direction of ejection of the droplets due to the sharp falling portion of the pulse signal.

Figure 14:
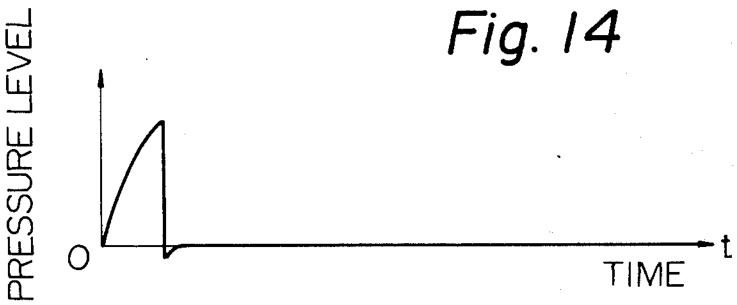
FIG. 14 is a time chart illustrating the pressure generated by the pulse signal.
Figure 15:
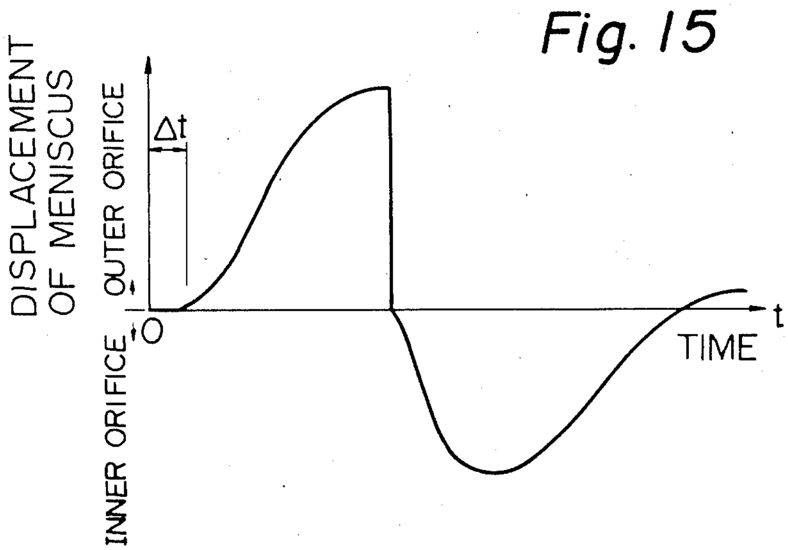
FIG. 15 is a time chart illustrating displacement of the meniscus by the pressure of FIG. 14.

The function or action of the apparatus for ejecting droplets of ink according to the present invention is illustrated in series in FIG. 8 to FIG. 12. The time charts in FIGS. 13, 14, and 15 show the actuating pulse signal, the generated pressure, and the displacement of the meniscus, respectively.

Figure 9:
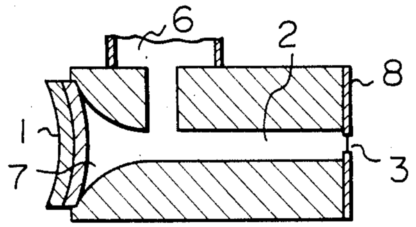
Figure 10:
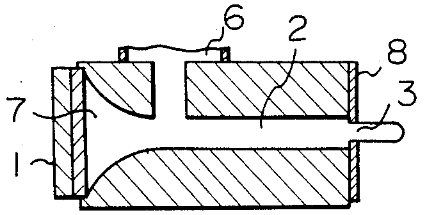
Figure 11:
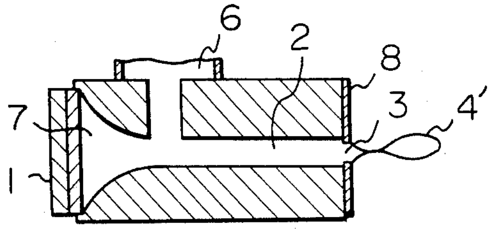
Figure 12:
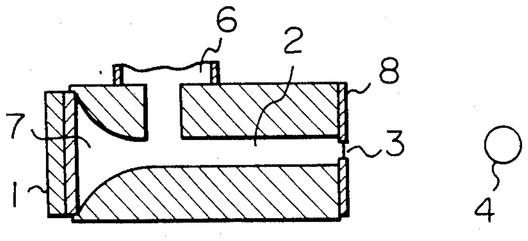
Figure 13:
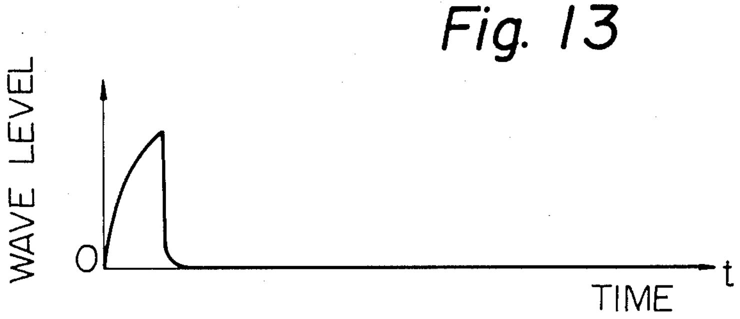
FIG. 13 is a time chart illustrating a pulse signal according to the present invention.

An electric pulse signal depicted in FIG. 13 is applied to the piezoelectric crystal chip 1 so as to deform the piezoelectric crystal chip 1. This pulse signal rises gradually and falls sharply. The peak frequency of the frequency characteristic of this pulse signal is the same as the frequency of the aforementioned inherent resonance (8 kHz). The applying time is shorter than 50 $\mu s$, preferably $5 \sim 30$ $\mu s$. Such a pulse signal makes it possible to obtain a desirable pressure wave which does not generate unnecessary oscillations which affect the ejection of droplets. When the pulse signal is applied to the piezoelectric crystal chip 1, the piezoelectric crystal chip 1 deforms toward the ink passage 2, as illustrated in FIG. 9. Then the piezoelectric crystal chip 1 is restored to its original state immediately (FIG. 10). The pressure wave generated in the pressure chamber 7 at this time is shown in FIG. 14. The pressure wave is propagated through the ink passage 2 so that the meniscus starts to become displaced after a time $\Delta t$, as is shown in FIGS. 10 and 15. The meniscus at the orifice 3 is oscillated at the resonance frequency. The ink projected from the orifice 3 due to the pressure wave is separated due to the inertia thereof and forms a droplet 4' (FIG. 11). Then the ink is ejected in the form of a particle 4 and the meniscus is restored due to the surface tension thereof (FIG. 12). The ink passage 2 is refilled with ink from the ink reservoir 6. In the above manner of ejection of the ink, the pulse signal applied to the piezoelectric crystal chip 1 has a sharp falling portion and the frequency thereof coincides with the inherent resonance frequency of the meniscus. Therefore, it is possible to restore the piezoelectric crystal chip 1 before or immediately after the meniscus begins to be displaced, i.e., it is unnecessary for the piezoelectric crystal chip 1 to remain deformed until the droplet of ink is separated. As is illustrated in FIG. 10, the piezoelectric crystal chip 1 is already restored at this stage. Accordingly, printing can be achieved at a high speed.

Figure 16:
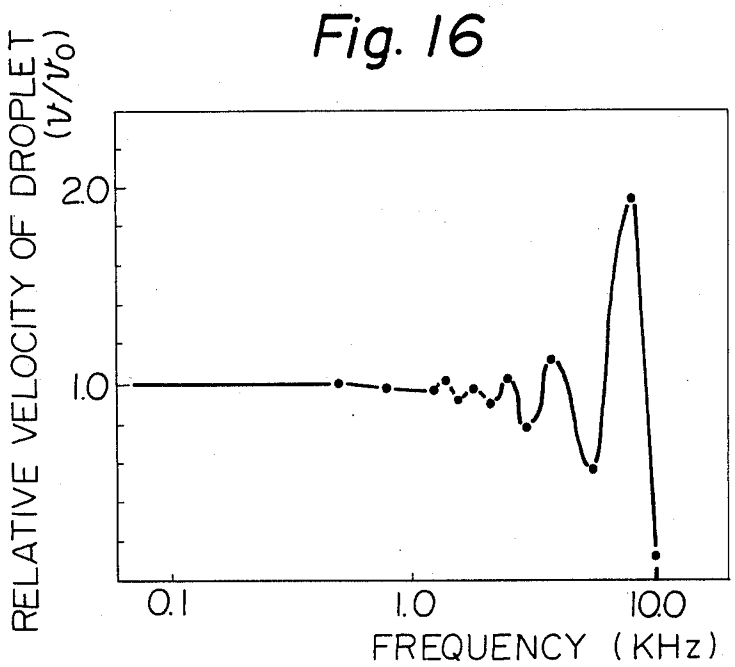
FIG. 16 is a graph illustrating the velocity ratio of ejected droplets with respect to the frequency.

FIG. 16 is a graph showing the velocity ratio $v/v_0$, in which v is the velocity of a droplet of ejected ink end $v_0$ is the velocity of another droplet of ink which is ejected just before the droplet ejected at a velocity of v. The abscissa represents the frequency of the actuating pulse signal, and the ordinate represents the ratio $v/v_0$. As can be seen from the graph, in the region of low frequency, i.e., where the interval between pulse signals is long, the velocity ratio $v/v_0$ is 1.0. Therefore, the velocity of the droplet is maintained at a constant speed. Also, it can be seen from the graph that the velocity ratio of a droplet is high at the resonance frequency (8 kHz).

In the above description of the invention, the inherent resonance frequency was described as being 8 kHz. However, the inherent resonance frequency is not limited to 8 kHz but depends upon the surface tension, compressibility, and density of the ink and the structure and size of the ink passage 2 or nozzle 3. The resonance frequency has a range of $3\sim15$ kHz in general.

Figure 17:
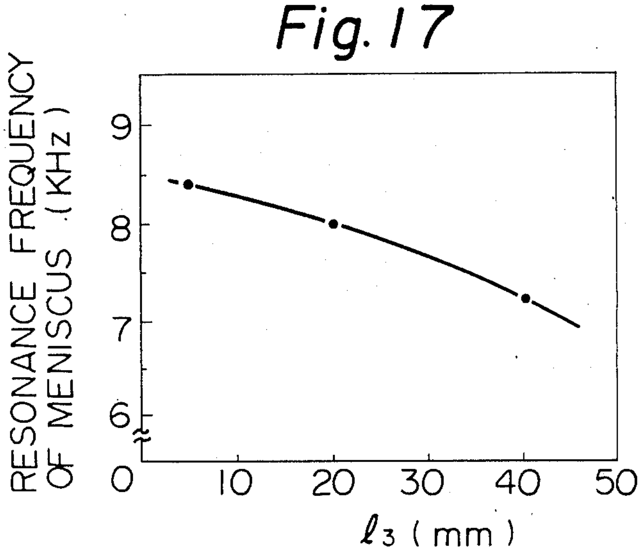
FIG. 17 is a graph illustrating the resonance frequency of the meniscus with respect to the length $l_3$ between the ink inlet and a piezoelectric crystal chip.

FIG. 17 is a graph showing a change in the inherent resonance frequency of the meniscus with respect to a change in the length $l_3$ (FIG. 1) of the ink passage 2 between the pressure chamber 7 and the ink reservoir 6. The actual actuating pulse signal should be selected in accordance with the resonance characteristic of the meniscus. The length of the ink passage 2 is one parameter for determining the resonance frequency.

Figure 18:
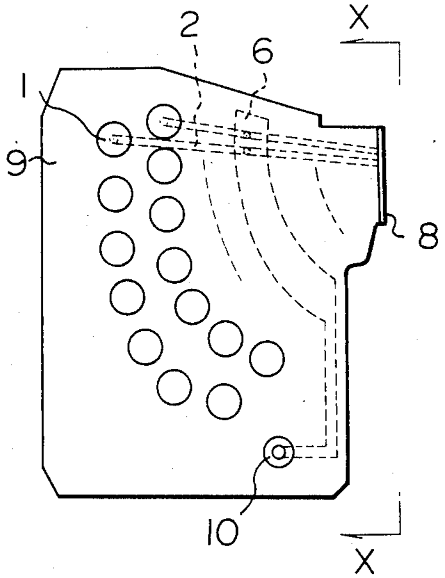
FIG. 18 is a front view of a multi-nozzle type of ink jet apparatus according to the present invention.
Figure 19:
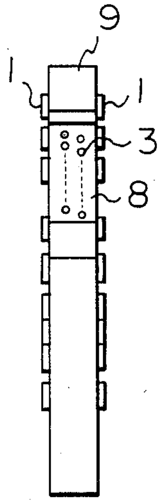
FIG. 19 is a view of the apparatus of FIG. 18 seen in the direction of the arrows X in FIG. 18.
Figure 20:
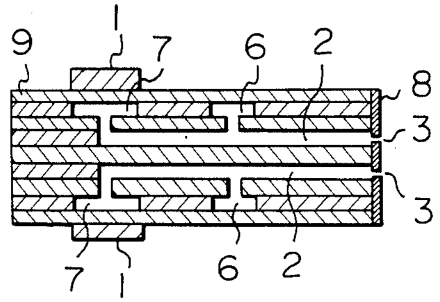
FIG. 20 is a sectional view of the ink jet apparatus of FIG. 18.

An example of a multi-nozzle head of an ink jet printer to which the present invention is applied is illustrated in FIGS. 18 to 20. A head 9 comprises a plurality of metal plates stacked in layers. Piezoelectric crystal chips 1, the number of which corresponds to the number of nozzles (orifices of ink passages) 3, are disposed on both side surfaces of the head 9. A pressure chamber 7 and an ink passage 2 are provided for each piezoelectric crystal chip 1. A common ink reservoir 6 is formed within the head 9 near each side surface thereof. Reference numeral 10 designates an inlet for supplying ink. The pressure chamber 7, the ink passage 2, and the ink reservoir 6 are formed by etching the metal plates. A nozzle plate 8, which has a plurality of orifices 3 in two rows, is disposed at the end of the ink passage 2. The rows of orifices 3 are slightly shifted in the longitudinal direction with respect to each other, as can be seen in FIG. 19.

Piezoelectric crystal chips 1 to be actuated are selected corresponding to the image to be printed and are actuated in the manner previously described. Any image or letter can be printed with dots at a high speed by scanning the printing paper with the multi-nozzle head.

Figure 21:
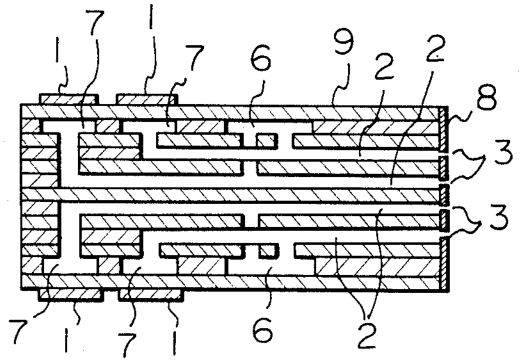
FIG. 21 is a sectional view of another multi-nozzle type of ink jet apparatus according to the present invention.

Another example of the multi-nozzle head is illustrated in FIG. 21. In this example, the number of layers of metal plates is increased so that the orifices 3 are disposed in four rows so as to obtain a finer image or letter by printing with dots.

Figure 22:
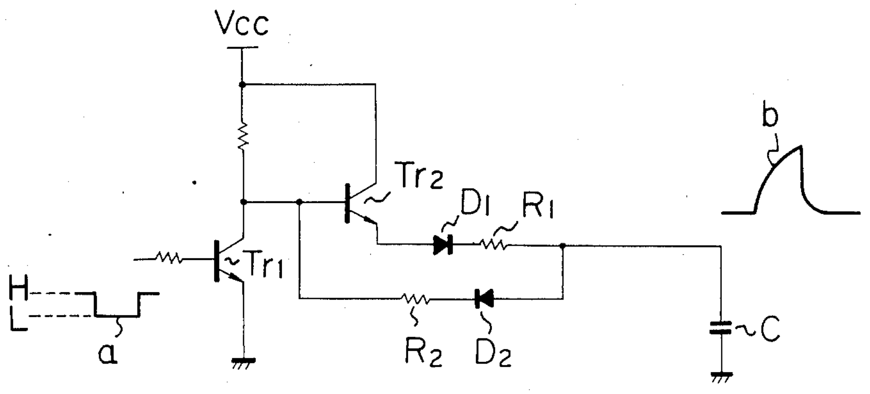
FIG. 22 is a diagram of a circuit for generating an actuating pulse signal according to the present invention.

An example of a circuit for generating a pulse signal for actuating the piezoelectric crystal chip 1 in the method according to the present invention is illustrated in FIG. 22. The circuit comprises two transistors $Tr_1$ and $Tr_2$, two diodes $D_1$ and $D_2$, two resistances $R_1$ and $R_2$, and a piezoelectric crystal chip (condenser) C. Such a circuit is prepared for each piezoelectric crystal chip (1 and C). A rectangular pulse signal a is applied to the transistor $Tr_1$. When the level of the pulse signal goes low (L level), the transistor $Tr_1$ is turned off and the potential of the base of the other transistor $Tr_2$ rises to $V_{cc}$ so that the transistor $Tr_2$ is turned on. Therefore, the piezoelectric crystal chip C is gradually charged through the diode $D_1$ and the resistance $R_1$. The rising curvature of the charging voltage (line b in FIG. 22) depends upon the value of the resistance $R_1$. When the potential of the base of the transistor $Tr_1$ returns to a high level H, the transistor $Tr_1$ is turned on so that the piezoelectric crystal chip C is discharged through the diode $D_2$ and the resistance $R_2$. The piezoelectric crystal chip C can be discharged in a short time by minimizing the value of the resistance $R_2$. In this manner, the pulse signal b can be obtained. The resistanced $R_1$ may be a variable resistance so that the rising rate of the voltage charging in the piezoelectric crystal chip C can be adjusted. By using such a variable resistance, it is possible to make the speed of droplets ejected from different orifices uniform, irrespective of a manufacturing error in the dimensions of the ink passage 2, the orifice 3, etc., provided for each piezoelectric crystal chip 1.

As mentioned above, according to the present invention, each droplet of ink can be ejected at a high rate, effectively and reliably, corresponding to each pulse signal since the pressure wave for the ejection of ink is generated by the pulse signal at the inherent resonance frequency of the meniscus at the orifice 3. It is possible to restore the piezoelectric crystal chip 1 before the droplet of ink is ejected since the ink is ejected by the propagated pressure wave generated in the above manner. Accordingly, the interval between ejections can be shortened so as to achieve high speed printing.

Unnecessary resonance at the orifice can be suppressed by appropriately selecting the viscosity of the ink and the frequency characteristic of the pulse signal. By this means, it is possible to prevent unnecessary satellite particles from being generated around each droplet of ink.

We claim:

1. An apparatus for ejecting droplets of ink, comprising:
- a passage for the ink;
- an orifice disposed at one end of said passage;
- pressure-applying means, communicating with the ink in said passage, for applying a pressure wave to the ink within said passage, comprising a piezoelectric crystal chip; and
- signal-supplying means, operatively connected to said piezoelectric crystal chip, for supplying an actuating pulse signal to said piezoelectric crystal chip, said actuating pulse signal rising gradually and falling sharply and having a frequency which maximizes the displacement due to said pressure wave of the ink surface at said orifice, said signal-supplying means including—
  - power source means for supplying power;
  - a first transistor having an emitter operatively connected to ground and a collector operatively connected to said power source means;
  - a second transistor having a collector operatively connected to said power source means, a base operatively connected to the collector of said first transistor and an emitter;
  - a first diode operatively connected to the emitter of said second transistor;
  - a first resistance operatively connected to said first diode and said piezoelectric crystal chip;
  - a second diode operatively connected to said first resistance and said piezoelectric crystal chip; and
  - a second resistance operatively connected to said second diode and the base of said second transistor.

2. An apparatus for ejecting droplets of ink as set forth in claim 1, wherein said first resistance is variable.

* * * * *